US010415982B2

(12) United States Patent
Park

(10) Patent No.: US 10,415,982 B2
(45) Date of Patent: Sep. 17, 2019

(54) VEHICLE AND CONTROL METHOD THEREOF

(71) Applicants: Hyundai Motor Company, Seoul (KR); Kia Motors Corporation, Seoul (KR)

(72) Inventor: Dae Sun Park, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 182 days.

(21) Appl. No.: 15/608,782

(22) Filed: May 30, 2017

(65) Prior Publication Data

US 2018/0164105 A1 Jun. 14, 2018

(30) Foreign Application Priority Data

Dec. 12, 2016 (KR) .......................... 10-2016-0168395

(51) Int. Cl.
*G01C 21/34* (2006.01)
*G01C 21/36* (2006.01)
*G08G 1/0968* (2006.01)
*G08G 1/0969* (2006.01)

(52) U.S. Cl.
CPC ......... *G01C 21/343* (2013.01); *G01C 21/362* (2013.01); *G01C 21/3617* (2013.01); *G08G 1/0969* (2013.01); *G08G 1/09685* (2013.01); *G08G 1/096827* (2013.01)

(58) Field of Classification Search
CPC ............... G01C 21/343; G01C 21/362; G01C 21/3617; G08G 1/09685; G08G 1/0969; G08G 1/096827

USPC ...................................................... 701/1, 411
See application file for complete search history.

(56) References Cited

U.S. PATENT DOCUMENTS

| | | | | |
|---|---|---|---|---|
| 5,568,390 A * | 10/1996 | Hirota | ................ | G01C 21/3469 340/990 |
| 6,654,684 B2 * | 11/2003 | Shinada | ............. | G01C 21/3605 701/431 |
| 7,668,644 B2 * | 2/2010 | Tengler | .................. | G01C 21/36 340/450.2 |
| 8,116,972 B2 * | 2/2012 | Klampfl | ............. | G01C 21/3679 340/439 |
| 8,504,236 B2 * | 8/2013 | Guo | .................... | G01C 21/3697 340/450.2 |
| 9,043,134 B2 * | 5/2015 | Rosekrans | ......... | G01C 21/3469 701/409 |
| 9,395,202 B2 * | 7/2016 | Roth | ................... | G01C 21/3476 |
| 9,638,542 B2 * | 5/2017 | Son | ..................... | G01C 21/3697 |

(Continued)

*Primary Examiner* — Jaime Figueroa
(74) *Attorney, Agent, or Firm* — Morgan, Lewis & Bockius LLP

(57) ABSTRACT

A vehicle may include a display configured to provide a user interface to enable a user to input a schedule; a communication module configured to receive information about a schedule from an external terminal; and a controller configured to calculate a first driving route including a stop, based on a place and time included in the schedule input through the display or received through the communication module, to decide a second driving route including a gas station as a new stop based on a Distance To Empty (DTE) of the vehicle and map information of navigation system, and to display the second driving route on the display.

16 Claims, 7 Drawing Sheets

(56) References Cited

U.S. PATENT DOCUMENTS

| | | | | |
|---|---|---|---|---|
| 2005/0149250 A1* | 7/2005 | Isaac | G01C 21/3679 | 701/32.3 |
| 2006/0058955 A1* | 3/2006 | Mehren | G01C 21/3469 | 701/533 |
| 2007/0090937 A1* | 4/2007 | Stabler | G07C 5/08 | 340/450.2 |
| 2007/0150171 A1* | 6/2007 | Tengler | G01C 21/36 | 701/123 |
| 2007/0290039 A1* | 12/2007 | Pfleging | G06Q 30/02 | 235/384 |
| 2008/0189033 A1* | 8/2008 | Geelen | G01C 21/3655 | 701/533 |
| 2010/0082230 A1* | 4/2010 | Hong | G01C 21/362 | 701/533 |
| 2011/0288765 A1* | 11/2011 | Conway | G01C 21/3469 | 701/533 |
| 2012/0116670 A1* | 5/2012 | Rosekrans | G01C 21/3469 | 701/426 |
| 2013/0226443 A1* | 8/2013 | Scofield | B60R 16/0232 | 701/123 |
| 2014/0129139 A1* | 5/2014 | Ellison | G01C 21/3469 | 701/533 |
| 2014/0172288 A1* | 6/2014 | Gutman | G01C 21/3469 | 701/400 |
| 2015/0106001 A1* | 4/2015 | Lee | G01C 21/3469 | 701/123 |
| 2015/0168172 A1* | 6/2015 | Roth | G01C 21/3476 | 701/123 |
| 2016/0349075 A1* | 12/2016 | Son | G01C 21/3697 | |
| 2017/0038222 A1* | 2/2017 | Meyer | G01C 21/26 | |

* cited by examiner

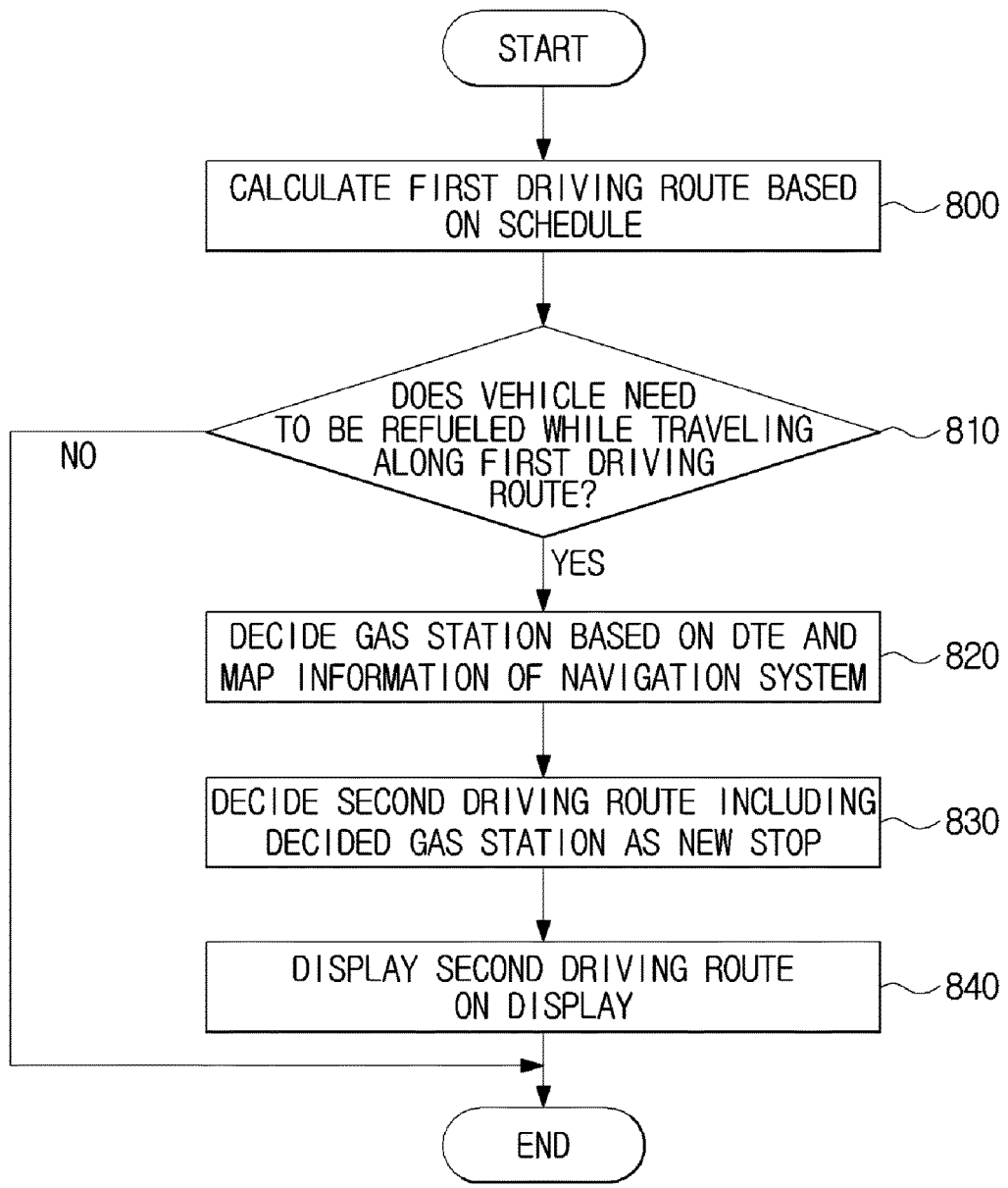

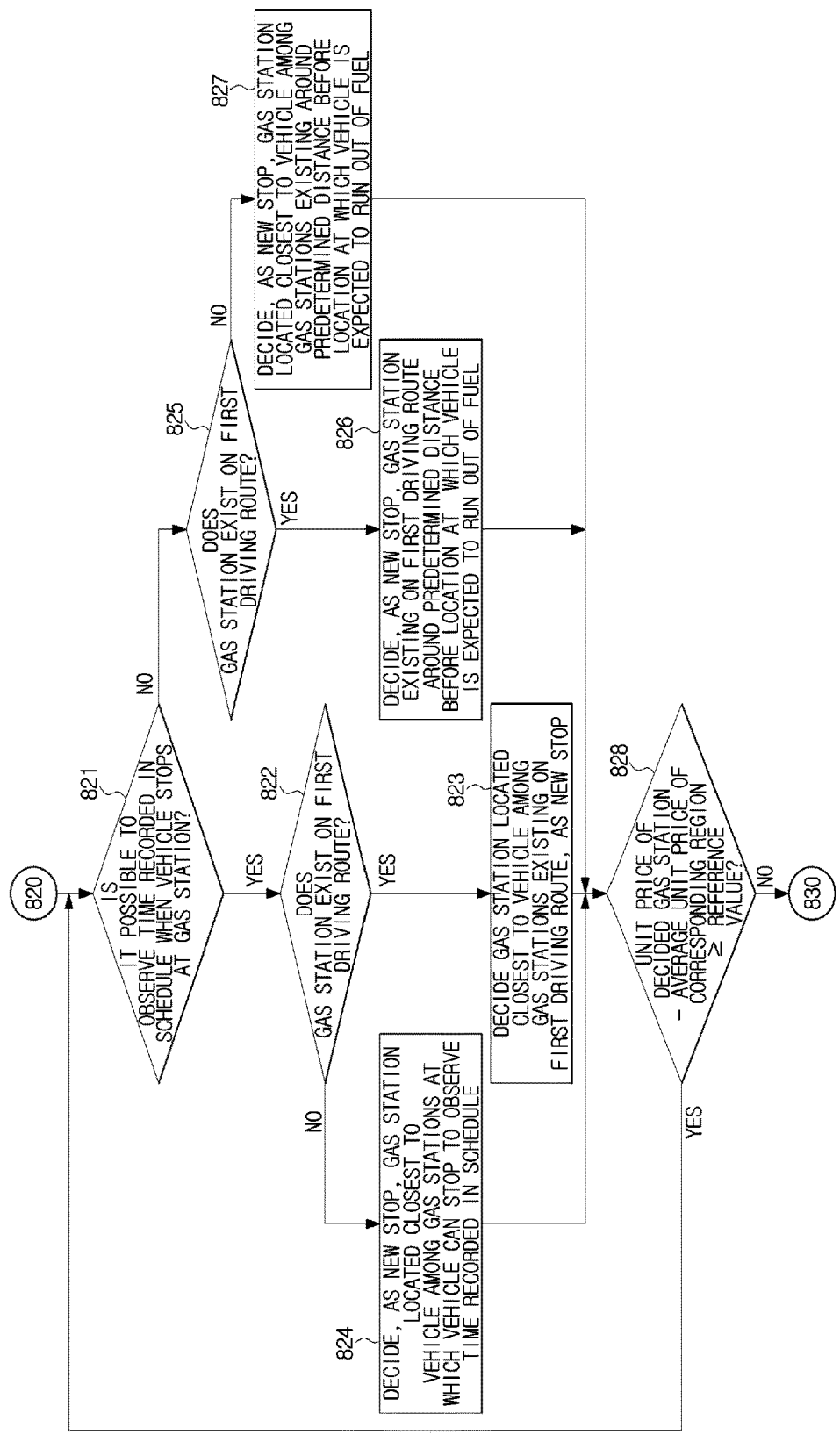

VEHICLE AND CONTROL METHOD THEREOF

CROSS-REFERENCE(S) TO RELATED APPLICATIONS

The present application claims priority to Korean Patent Application No. 10-2016-0168395, filed on Dec. 12, 2016, the entire contents of which is incorporated herein for all purposes by this reference.

BACKGROUND OF THE INVENTION

Field of the Invention

The present invention relate to a vehicle.

Description of Related Art

With the diffusion of mobile communication terminals, many peoples manage their schedules through mobile communication terminals or computers.

Also, with the development of mobile communication technologies, a schedule inputted through a mobile communication terminal or a computer can be shared with other devices through real-time data linking.

Recently, continuous attempts to provide various services for vehicle through linking with mobile communication terminals have been made.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle capable of receiving schedule information stored in an external terminal, arranging the places recorded in the schedule according to the time recorded in the schedule to recommend a route, and providing a route including a gas station as a new stop when the vehicle needs to be refueled, and a method of controlling the vehicle.

Additional aspects of the present invention will be set forth in part in the description which follows and, in part, will be obvious from the description, or may be learned by practice of the invention.

In accordance with an aspect of the present invention, a vehicle includes a display configured to provide a user interface to enable a user to input a schedule, a communication module configured to receive information about a schedule from an external terminal, and a controller configured to determine a first driving route including a stop based on a place and time included in a schedule, inputted through the display or received through the communication module, to decide a second driving route including a gas station as a new stop based on a Distance To Empty (DTE) of the vehicle and map information of navigation system, and to display the second driving route on the display.

The controller is configured to arrange the place included in the schedule according to the time included in the schedule, and displays the arranged place and estimated time of arrival (ETA) at the place on the display.

When a gas station exists on the first driving route, and it is possible to observe time of arrival at the place included in the schedule when the vehicle stops at the gas station, the controller is configured to determine the gas station existing on the first driving route as the new stop.

When a gas station does not exist on the first driving route, the controller is configured to determine as the new stop a gas station, among one or more gas stations around the first driving route, at which the vehicle is able to stop to observe time of arrival at the place included in the schedule.

When it is impossible to observe time of arrival at the place included in the schedule when the vehicle stops at the gas station, the controller is configured to determine as the new stop a gas station on the first driving route existing around a predetermined distance before a location at which the vehicle is expected to run out of fuel.

When it is impossible to observe time of arrival at the place included in the schedule when the vehicle stops at the gas station and gas station does not exist on the first driving route, the controller is configured to determine as the new stop the gas station located closest to the vehicle among one or more gas stations existing around a predetermined distance before a location at which the vehicle is expected to run out of fuel.

The controller is configured to determine a gas station based on the DTE of the vehicle and the map information of the navigation system, and when the unit price of the decided gas station is higher than an average unit price of a region where the decided base station is located by a predetermined reference value or more, the controller is configured to determine another gas station as the new stop.

When a gas station exists on the first driving route and it is possible to observe time of arrival at the place included in the schedule when the vehicle stops at the gas station on the first driving route, the controller is configured to determine the gas station existing on the first driving route as the other gas station.

When gas station does not exist on the first driving route, the controller is configured to determine as the other gas station a gas station at which the vehicle is able to stop to observe time of arrival at the place included in the schedule, among one or more gas stations around the first driving route.

When it is impossible to observe time of arrival at the place included in the schedule when the vehicle stops at the gas station, the controller is configured to determine as the other gas station a gas station on the first driving route existing around a predetermined distance before a location at which the vehicle is expected to run out of fuel.

When it is impossible to observe time of arrival at a place included in the schedule when the vehicle stops at the gas station and no gas station exists on the first driving route, the controller is configured to determine as the other gas station a gas station located closest to the vehicle among one or more gas stations existing around a predetermined distance before a location at which the vehicle is expected to run out of fuel.

In accordance with an aspect of the present invention, a method of controlling a vehicle includes determining a first driving route including a stop based on a place and time included in a schedule inputted through a display or received through a communication module; deciding a second driving route including a gas station as a new stop based on a Distance To Empty (DTE) of the vehicle and map information of navigation system; and displaying the second driving route on the display.

Displaying the second driving route on the display includes arranging the place included in the schedule according to the time included in the schedule to display the place on the display; and displaying the ETA at the arranged place on the display.

Deciding the second driving route which integrates the gas station as the new stop based on the DTE of the vehicle and the map information of the navigation system includes when a gas station exists on the first driving route and it is possible to observe time of arrival at the place included in the schedule when the vehicle stops at the gas station, deciding the present gas station existing on the first driving route as the new stop.

Deciding the second driving route which integrates the gas station as the new stop based on the DTE of the vehicle and the map information of the navigation system includes when no gas station exists on the first driving route, deciding as the new stop a gas station at which the vehicle is able to stop to observe time of arrival at the place included in the schedule, among one or more gas stations around the first driving route.

Deciding the second driving route including the gas station as the new stop based on the DTE of the vehicle and the map information of the navigation system includes when it is impossible to observe time of arrival at the place included in the schedule when the vehicle stops at the gas station, deciding as the new stop a gas station on the first driving route existing around a predetermined distance before a location at which the vehicle is expected to run out of fuel.

Deciding the second driving route which integrates the gas station as the new stop based on the DTE of the vehicle and the map information of the navigation system includes when it is impossible to observe time of arrival at the place included in the schedule when the vehicle stops at the gas station, and no gas station exists on the first driving route, deciding as the new stop a gas station located closest to the vehicle among one or more gas stations existing around a predetermined distance before a location at which the vehicle is expected to run out of fuel.

Deciding the second driving route which integrates the gas station as the new stop based on the DTE of the vehicle and the map information of the navigation system includes deciding a gas station based on the DTE of the vehicle and the map information of the navigation system; and deciding another gas station as the new stop, when a unit price of the decided gas station is higher than an average unit price of a region where the decided gas station is located by a predetermined reference value or more.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 and FIG. 7 are flowcharts illustrating a method of controlling a vehicle according to an exemplary embodiment of the present invention.

Figure 1:
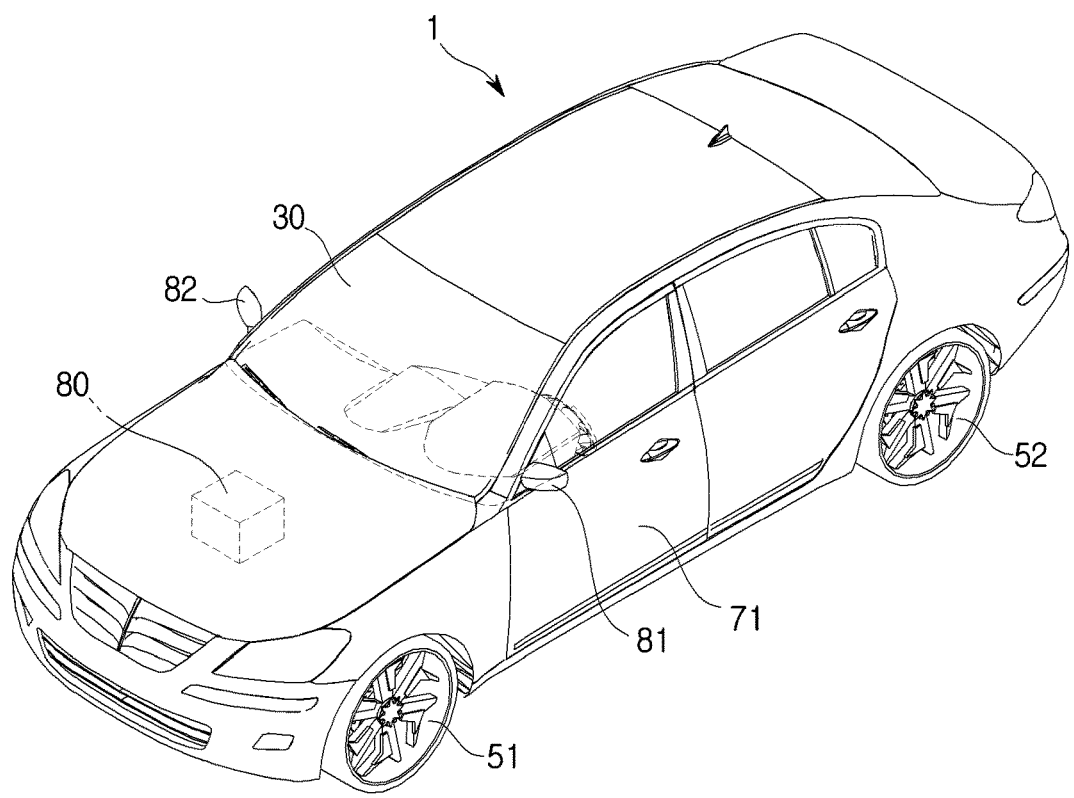
FIG. 1 shows the external appearance of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present specification does not describe all components of the embodiments, and general information in the technical field to which the present invention belongs or overlapping information between the embodiments will not be described. The terms "part" and "portion", as used herein, may be implemented as software or hardware, and according to embodiments, a plurality of "parts" or "portions" may be implemented as a single component, or a single "part" or "portion" may include a plurality of components.

Also, it will be understood that when the terms "includes," "comprises," "including," and/or "comprising," when used in the present specification, specify the presence of a stated component, but do not preclude the presence or addition of one or more other components.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, the operation principle and embodiments of the present invention will be described with reference to the accompanying drawings.

Figure 2:
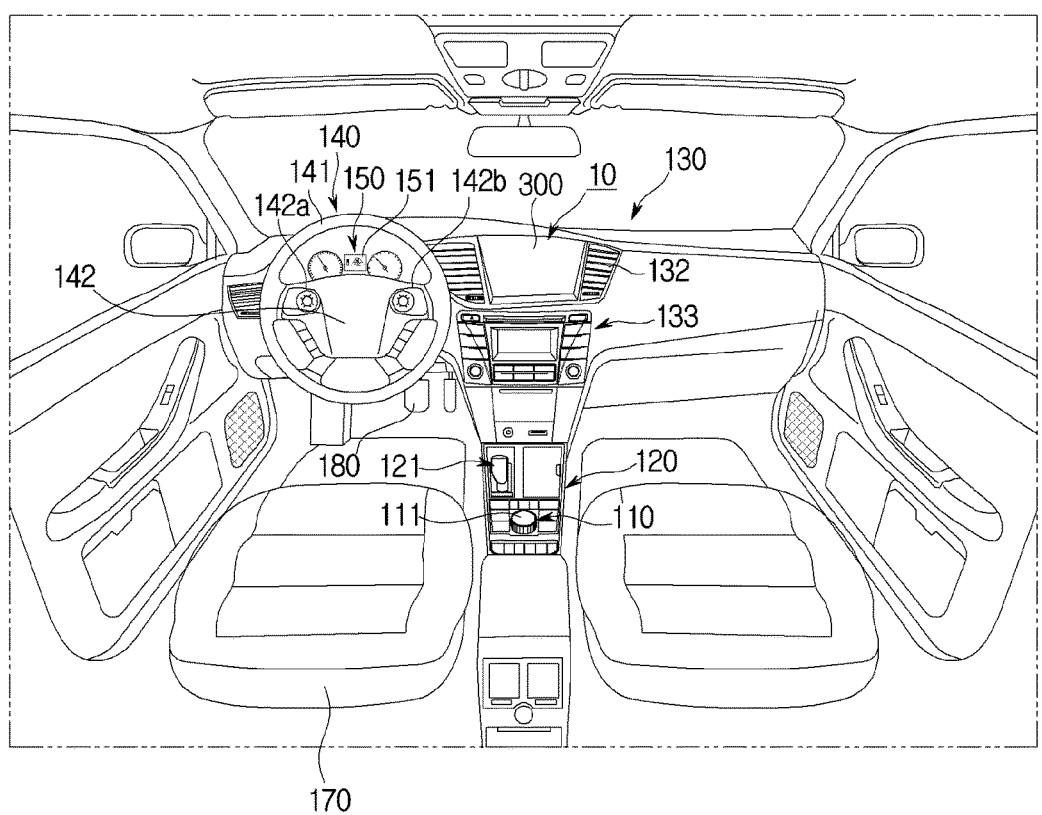
FIG. 2 shows the interior of the vehicle according to an exemplary embodiment of the present invention.

FIG. 1 shows the external appearance of a vehicle according to an exemplary embodiment of the present invention, and FIG. 2 shows the interior of the vehicle according to the exemplary embodiment of the present invention. Referring to FIG. 1, a vehicle 100 according to an exemplary embodiment of the present invention may include a main body 1 forming the external appearance of the vehicle 100, a plurality of wheels 51 and 52 configured to move the vehicle 100, a driving apparatus 80 configured to rotate the wheels 51 and 52, a plurality of doors 71 configured to shield the inside of the vehicle 100 from the outside, a front glass 30 configured to provide a driver in the inside of the vehicle 100 with a front view of the vehicle 100, and side-view mirrors 81 and 82 configured to provide the driver with a rear view of the vehicle 100.

The wheels 51 and 52 may include a plurality of front wheels 51 disposed in the front portion of the vehicle 100, and a plurality of rear wheels 51 disposed in the rear portion of the vehicle 100.

The driving apparatus 80 may provide rotatory power to the front wheels 51 or the rear wheels 52 wherein the main body 1 moves forward or backward. The driving apparatus 80 may include an engine to burn fossil fuel or a motor to receive power from a battery or a fuel cell to produce rotatory power. When the driving apparatus 80 includes a motor, the driving apparatus 80 may include an inverter for controlling the rotation of the motor.

The doors 71 may be rotatably disposed to the left and right of the main body 1 to allow the driver enter and exit the vehicle 100. Also, the doors 71 may shield the interior of the vehicle 100 from the outside when closed.

The front glass 30, which is also called a windshield glass, may be disposed in the upper front part of the main body 1 to allow the driver inside the vehicle 100 to acquire a front view of the vehicle 100. Also, the side-view mirrors 81 and 82 may include a left side-view mirror 81 disposed to the left of the main body 1 and a right side-view mirror 82 disposed to the right of the main body 1 to allow the driver inside the vehicle 100 to be able to see side and rear situations of the vehicle 100 with his or her eyes.

In addition, the vehicle 100 may include various sensors for sensing an obstacle, etc. around the vehicle 100 to help the driver recognize a situation around the vehicle 100. Also, the vehicle 100 may include various sensors for detecting driving information of the vehicle 100, such as the speed of the vehicle 100. Also, the vehicle 100 may include a sensor to acquire images of the surroundings of the vehicle 100 including lanes, etc.

As shown in FIG. 2, the vehicle 100 may include a dashboard in which a gear box 120, a center fascia 130, a steering wheel 140, an instrument panel 150, etc. are disposed.

In the gear box 120, a gear lever 121 for shifting gears may be disposed. Also, as shown in FIG. 2, the gear box 120 may include a dial manipulator 111 configured to enable a user to control execution of the functions of a navigation system 10 or a multimedia system including an audio system 133 or the main functions of the vehicle, and an input device 110 including various buttons. In the center fascia 130, an air conditioner 132, the audio system 133, and the navigation system 10 may be disposed.

The air conditioner 132 may adjust the temperature, humidity, air quality, and flow of air inside the vehicle 100 to maintain the inside of the vehicle 100 pleasant. The air conditioner 132 may be disposed in the center fascia 130, and may include at least one vent for discharging air. In the center fascia 130, at least one button or dial for controlling the air conditioner 132, etc. may be provided. A user, for example, the driver can use the button or dial provided on the center fascia 130 to control the air conditioner 132 of the vehicle. Also, the user can control the air conditioner 132 through the buttons of the input device 110 or the dial manipulator 111 disposed in the gear box 120.

According to an embodiment, in the center fascia 130 the navigation system 10 may be disposed. The navigation system 10 may be embedded into the center fascia 130 of the vehicle. According to an embodiment, in the center fascia 130 an input device for controlling the navigation system 10 may be disposed. According to another exemplary embodiment, the input device of the navigation system 10 may be disposed at another location instead of the center fascia 130. For example, the input device of the navigation system 10 may be disposed around a display device 300 of the navigation system 10. According to still another example, the input device of the navigation system 10 may be disposed in the gear box 120.

The steering wheel 140 may be used to adjust the driving direction of the vehicle 100 and may include a rim 141 that is gripped by a driver, and a spoke 142 connected to a steering apparatus of the vehicle 100 connecting the rim 141 to a hub of a rotation shaft for steering. According to an embodiment, the spoke 142 may include manipulators 142a and 142b configured for controlling various devices (for example, the audio system) disposed in the vehicle 100. Also, in the dashboard, an instrument panel 150 may be disposed to display speed, Revolutions Per Minute (RPM), the amount of remaining fuel, a Distance to Empty (DTE), etc. of the vehicle 100. The instrument panel 150 may include an instrument panel display 151 configured to display information related to the state and driving of the vehicle, information related to manipulations of the multimedia system, etc.

The driver may manipulate the above-described various devices disposed in the dashboard to drive the vehicle 100.

Meanwhile, with the development of mobile communication technologies, a schedule input through a mobile communication terminal, a computer, or the like can be shared with vehicles. In the schedule, appointed places, appointed time, etc. may be recorded. The places and time included in the schedule may represent stops on a user's moving route. Accordingly, when a driving route of a specific date is decided based on the places and time included in the schedule, and the driving route is provided to the user, the user's convenience will increase since he or she does not need to input the places one by one. Also, when the fuel quantity of the vehicle 100 or the charged level of the battery (in the case of an electric vehicle) is monitored, and the most appropriate gas stations are included in the driving route so that the vehicle 100 can be refueled or charged as necessary while observing the time recorded in the schedule, the user's convenience will further increase. Hereinafter, a vehicle which provides a driving route in connection to a schedule, and a method of controlling the vehicle will be described in detail with reference to FIG. 3 to FIG. 5.

Figure 3:
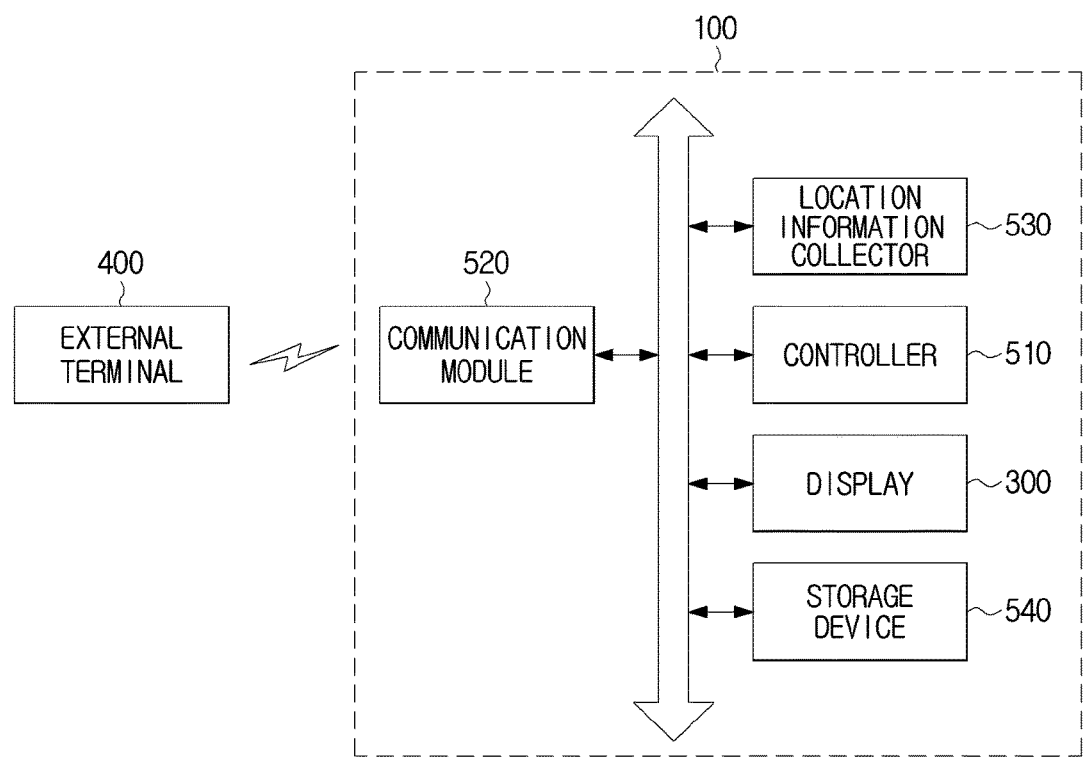
FIG. 3 is a control block diagram of a vehicle according to an exemplary embodiment of the present invention.
Figure 4:
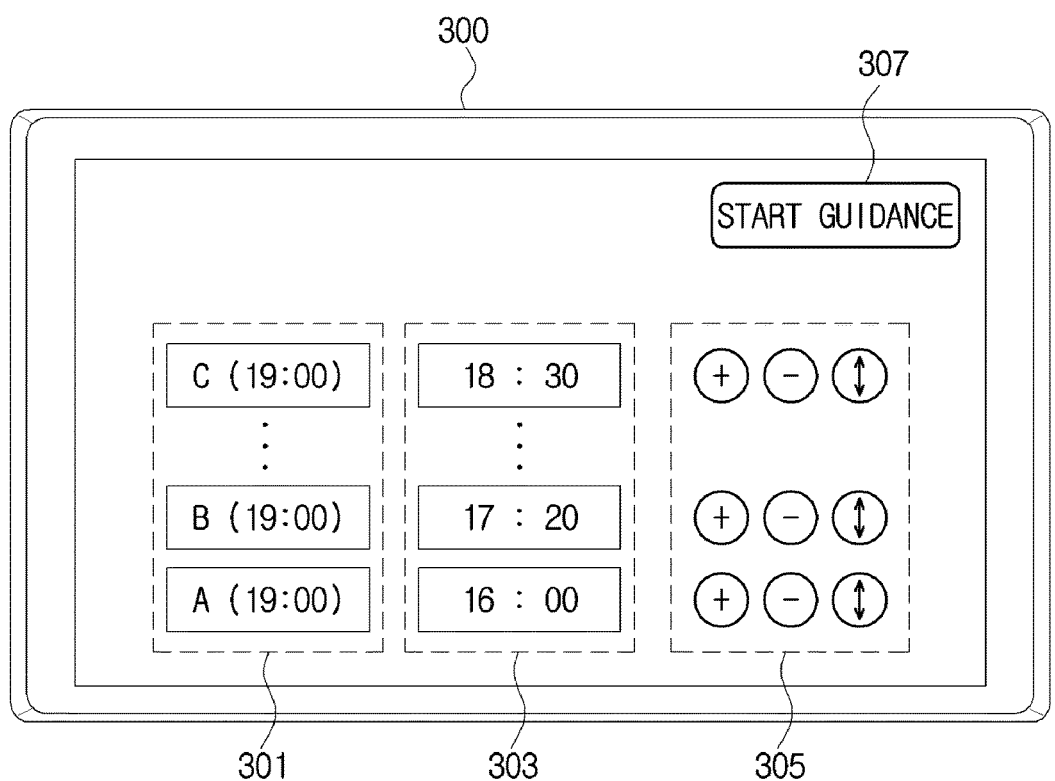
FIG. 4 shows a screen for guiding a driving route determined by a linked schedule on a display of the vehicle according to an exemplary embodiment of the present invention.
Figure 5:
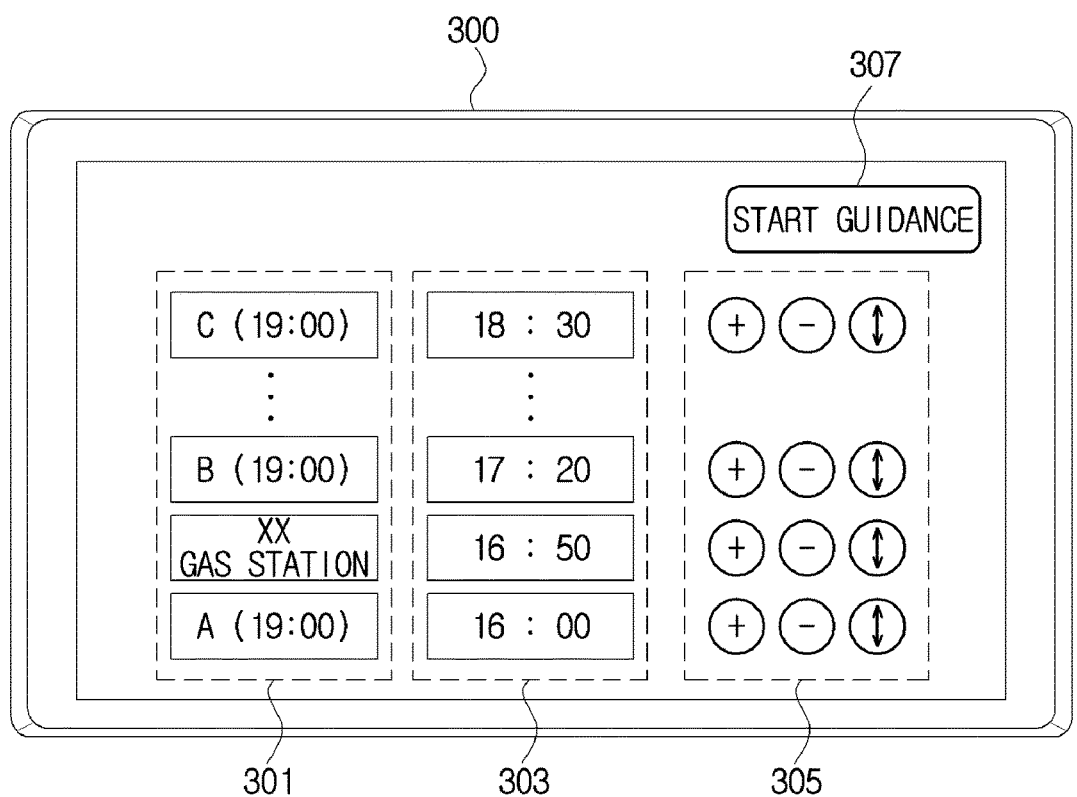
FIG. 5 shows a screen for guiding a driving route determined by including a gas station as a new stop on the display of the vehicle according to an exemplary embodiment of the present invention.

FIG. 3 is a control block diagram of a vehicle according to an exemplary embodiment of the present invention, FIG. 4 shows a screen for guiding a driving route determined by a linked schedule on a display of the vehicle according to the exemplary embodiment of the present invention, and FIG. 5 shows a screen for guiding a driving route determined by including a gas station as a new stop on the display of the vehicle according to the exemplary embodiment of the present invention.

As shown in FIG. 3, the vehicle 100 according to an exemplary embodiment of the present invention may include a communication module 520 configured to communicate with an external terminal 400, a location information collector 530 configured to collect location information of the vehicle 100, a storage device 540 configured to store navigation map information, a display 300 configured to provide a user interface to enable a user to input a schedule and to display a driving route, and a controller 510 configured to determine a driving route according to places and time included in the schedule, and to control the display 300 to display the driving route. The location information collector 530 of the vehicle 100 may be configured to collect GPS coordinates of the vehicle 100 every predetermined time period. The location information collector 530 may include a GPS apparatus and memory, and store GPS coordinates of the vehicle 100 acquired by the GPS apparatus in the memory. Alternatively, the location information collector 530 may be separated from the GPS apparatus, and include memory to receive GPS coordinates of the vehicle 100 acquired by the GPS apparatus every first period and to store the GPS coordinates. The memory may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or storage medium, such as Hard Disk Drive (HDD) and Compact Disc Read Only Memory (CD-ROM), although not limited to these.

The communication module 520 may download a schedule stored in the external terminal 400 including a mobile communication terminal or a computer capable of connecting to the Internet, through wireless communication with the external terminal 400. The schedule downloaded by the communication module 520 may be stored in the storage device 540. The communication module 520 may communicate with the external terminal 400 every predetermined time period to update the schedule periodically.

Also, the communication module 520 may receive information related to fuel prices of gas stations through wireless communication with a telematics server and store the received information in the storage device 540. The information related to the fuel prices of the gas stations may be used for the controller 510 to recommend gas stations. The communication module 520 may include a wireless communication module to enable communication with the external terminal 400 or a server, and may further include at least one of a short-range communication module and a wired communication module.

The wireless communication module may include supporting various wireless communication methods, such as Global System for Mobile Communication (GSM), Code Division Multiple Access (CDMA), Wideband Code Division Multiple Access (WCDMA), Time Division Multiple Access (TDMA), Long Term Evolution (LTE), and the like, as well as a Wireless-Fidelity (Wi-Fi) module and a Wireless Broadband module.

The wireless communication module may include a wireless communication interface including a communication port configured to connect the controller 510 to a wireless communication network, and a transmitter to transmit location information. Also, the wireless communication module may further include a signal conversion module configured to convert a digital control signal output from the controller 510 through the wireless communication interface into an analog wireless signal, under the control of the controller 510.

The wireless communication module may further include a wireless communication interface including a communication port to connect the controller 510 to a wireless communication network, and a receiver to receive traffic information or a message of limiting collection of location information. Also, the wireless communication module may further include a signal conversion module to demodulate an analog wireless signal received through the wireless communication interface into a digital control signal.

The short-range communication module may include various short-range communication modules, such as a Bluetooth module, an infrared communication module, a Radio Frequency Identification (RFID) communication module, a Wireless Local Access Network (WLAN) communication module, a Near Field Communication (NFC) module, a Zigbee communication module, and the like, which transmits and receives signals through a wireless communication network at a short range.

The wired communication module may include various cable communication modules, such as a Universal Serial Bus (USB), a High Definition Multimedia Interface (HDMI), a Digital Visual Interface (DVI), Recommended Standard-232 (RS-232), power line communication, Plain Old Telephone Service (POTS), and the like, as well as various wired communication modules, such as a Controller Area Network (CAN) communication module, a Local Area Network (LAN) module, a Wide Area Network (WAN) module, a Value Added Network (VAN) module, and the like.

The display 300 may provide a user interface that is similar to the user interface provided by the external terminal 400 to enable a user to input a schedule, and a user may input a schedule through the user interface displayed on the display 300.

When a schedule is received by the communication module 520, or a schedule is input through the display 300, the controller 510 may determine a driving route of the vehicle 100 according to the places and time included in the schedule.

When the schedule is received or input, the controller 510 may determine whether the places or time are stored in the schedule. When the controller 510 determines that neither places nor time are stored in the schedule, the controller 510 may not determine a driving route based on the schedule.

When the controller 510 determines that places and the time related to the places are stored in the schedule, the controller 510 may arrange the places included in the schedule according to time. That is, the controller 510 may display the places arranged according to time on the display 300, as shown in FIG. 4. More specifically, the display 300 may provide a first area 301 displaying the places included in the schedule and time (for example, time of arrival) related to the places. In the first area 301, the places may be arranged in descending or ascending order of time. Also, the display 300 may provide a second area 303 displaying the ETA at which the vehicle 100 is expected to arrive at the individual places. The controller 510 may reflect road information, speed information, or real-time traffic information stored in the map data of the navigation system 10 to determine ETA, and display the ETA in the second area 303.

Also, the controller 510 may display a third area 305 to enable the user to edit the places arranged according to time. In the third area 305, objects "+" and "−" for receiving a command for adding or removing schedule items, and objects "↕" for receiving a command for changing the order of schedule items may be displayed.

Also, an object 307 for receiving a command for starting route guidance according to information displayed in the individual areas may be displayed.

However, the screen of the display 300 shown in FIG. 4 is only exemplary. That is, the sizes, shapes, and locations of the individual areas are not limited, and the forms or shapes or of the objects may also vary.

The controller 510 may determine a first driving route based on the places and time included in the schedule, as described above. The controller 510 may control the navigation system 10 to start route guidance according to the first driving route, unless the vehicle 100 needs to be refueled while traveling along the first driving route.

When the controller 520 determines that the vehicle 100 needs to be refueled while traveling along the first driving route, based on navigation map data and a DTE determined according to the amount of remaining fuel and fuel efficiency, the controller 510 may search for a gas station or a charging station (hereinafter, for convenience of description, referred to as a gas station) to decide a gas station.

The controller 510 may determine a DTE of the vehicle 100 and time at which the vehicle 100 is expected to run out of fuel, and decide a recommended gas station based on the navigation map data. For example, when the controller 510 expects that the vehicle 100 will run out of fuel while moving from a place A to another place B, the controller 510 may decide a recommended gas station from among gas stations located between the place A and the other place B using the navigation map data, and include the decided gas station as a new stop in the first driving route.

That is, the controller 510 may determine a second driving route by including the gas station as a new stop in the first driving route, and control the display 300 to display a screen including the gas station as a new stop, as shown in FIG. 5.

When route guidance, according to the second driving route including the gas station as a new stop, is accepted by the user, the controller 510 may guide driving of the vehicle 100 according to the second driving route.

Hereinafter, a method in which the controller 510 decides a gas station that is to be added as a new stop will be described in more detail.

When the controller 510 determines that the vehicle 100 needs to be refueled while traveling along the first driving route, the controller 510 may decide a time period required until the vehicle 100 is refueled. That is, the controller 510 may divide the DTE by average speed of the corresponding road to determine a time period (a first time period) for which the vehicle 100 can travel with the current remaining fuel, and then determine a time period (a second time period) taken for the vehicle 100 to travel the remaining distance after the vehicle 100 completely runs out of fuel. Controller 510 may sum the first time period and the second time period to determine a third time period.

Then, the controller 510 may determine whether it is possible to observe time recorded in the schedule in consideration of the third time period. The case in which it is possible to observe time recorded in the schedule may be set to a case in which the vehicle 100 can arrive within ten minutes before or after the recorded time. That is, the controller 510 may determine whether it is possible to observe the time recorded in the schedule after the vehicle 100 stops at the gas station to be refueled.

When the controller 510 determines that it is possible to observe the time recorded in the schedule when the vehicle 100 stops at a gas station, the controller 510 may determine whether a gas station exists on the first driving route. When the controller 510 determines that a plurality of gas stations exist on the first driving route, the controller 510 may decide a gas station located closest to the current location of the vehicle 100 among the plurality of gas stations as a new stop, and when the controller 510 determines that a single gas station exists on the first driving route, the controller 510 may decide the gas station as a new stop.

When the controller 510 determines that no gas station exists on the first driving route, the controller 510 may decide as a new stop a gas station located closest to the current location among gas stations at which the vehicle 100 can stop to observe the time recorded in the schedule.

When the controller 510 determines that it is impossible to observe the time recorded in the schedule when the vehicle 100 stops at a gas station, the controller 510 may determine whether a gas station exists on the first driving route. When the controller 510 determines that a gas station exists on the first driving route, the controller 510 may decide as a new stop a gas station located closest to the current location among gas stations on the first driving route around a predetermined distance, for example 10 Km, before a location at which the vehicle 100 is expected to run out of fuel.

When the controller 510 determines that no gas stations exists on the first driving route, the controller 510 may decide as a new stop a gas station located closest to the current location among gas stations existing around a predetermined distance, for example 10 Km, before the location at which the vehicle 100 is expected to run out of fuel.

After the controller 510 decides a gas station through the above-described process, the controller 510 may compare fuel prices of gas stations to finally decide a gas station that is to be added as a new stop.

That is, after the controller 510 decides a gas station through the above-described process, the controller 510 may decide a fuel price of the decided gas station, that is a unit price, such as, a price per liter. The unit price of the gas station may be decided using information included in the navigation map data, or provided as information updated in real time by the communication module 520 of communicating with a server.

The controller 510 may compare the unit price of the gas station to an average unit price of a region where the corresponding gas station is located. When the controller 510 determines that the unit price of the gas station is higher than the average unit price of the corresponding region by a predetermined reference value or more, the controller 510 may search another gas station.

When the fuel price of the gas station is higher than the average fuel price of the region by the reference value or more, the controller 510 may search for another gas station to again recommend the gas station. In the present case, the controller 510 may repeat the above-described process to again decide a gas station.

When the controller 510 determines that the unit price of the gas station is lower than the average unit price of the corresponding region, or that a difference between the unit price of the gas station and the average unit price of the corresponding region is smaller than the predetermined reference value, the controller 510 may finally decide the determined gas station as a new stop, and display the gas station on the display 300, as shown in FIG. 5.

Hereinafter, a process of deciding a second driving route including a gas station as a new stop will be described with reference to FIG. 6 and FIG. 7. FIG. 6 and FIG. 7 are flowcharts illustrating a method of controlling a vehicle according to an exemplary embodiment of the present invention.

Referring to FIG. 6, the controller 510 may determine a first driving route based on schedule information, in operation 800. Then, the controller 510 determines whether the vehicle 100 needs to be refueled while traveling along the first driving route, in operation 810. When the controller 510 determines that the vehicle 100 needs to be refueled, the controller 510 may decide a gas station based on the DTE and navigation map information, in operation 820.

When a schedule is received or input, the controller 510 may determine whether the place or time is stored in the schedule. When the controller 510 determines that a place and time related to the place are stored in the schedule, the controller 510 may arrange the place stored in the schedule according to time. That is, the controller 510 may display the place arranged according to time on the display 300, as shown in FIG. 4. Then, the controller 510 may determine a first driving route based on the place or time included in the schedule, as described above. The controller 510 may control the navigation system 10 to start route guidance according to the first driving route, unless the vehicle 100 needs to be refueled while traveling along the first driving route.

When the controller 510 determines that the vehicle 100 needs to be refueled while traveling along the first driving route, based on a DTE determined according to the amount of remaining fuel and fuel efficiency, navigation map data, etc., the controller 510 may search and decide a gas station.

The controller 510 may determine a DTE of the vehicle 100 and time at which the vehicle 100 is expected to run out of fuel, and decide a recommended gas station based on navigation map data. For example, when the controller 510 expects that the vehicle 100 will run out of fuel while moving from a place A to another place B, the controller 510 may decide a recommended gas station among gas stations located between the place A and the other place B using the navigation map data, and include the decided gas station as a new stop.

That is, the controller 510 may determine a second driving route by including the gas station as a new stop in the first driving route, and display a screen including the gas station as a new stop on the display 300, as shown in FIG. 5.

When route guidance according to the second driving route including the gas station as a new stop is accepted by the user, the controller 510 may guide the driving of the vehicle 100 according to the second driving route.

FIG. 7 is a flowchart illustrating operation 820 of FIG. 6 in detail, and hereinafter, a process of deciding a gas station will be described with reference to FIG. 7. Referring to FIG. 7, the controller 510 may determine whether it is possible to observe the time recorded in the schedule when the vehicle 100 stops at the gas station, in operation 821. When the controller 510 determines that it is possible to observe the time recorded in the schedule when the vehicle 100 stops at the gas station, the controller 510 may determine whether a gas station exists on the first driving route in operation 822. When the controller 510 determines that one or more gas stations exist on the first driving route, the controller 510 may decide a gas station located closest to the current location of the vehicle 100 among the gas stations existing on the first driving route as a new stop in operation 823. When the controller 510 determines in operation 822 that no gas station exists on the first driving route, the controller 510 may decide as a new stop a gas station located closest to the current location among gas stations at which the vehicle 100 can stop to observe the time recorded in the schedule, in operation 824.

When the controller 510 determines that the vehicle 100 needs to be refueled while traveling along the first driving route, the controller 510 may decide a time period required until the vehicle 100 is refueled. That is, the controller 510 may divide the DTE by average speed of the corresponding road to determine a first time period for which the vehicle 100 can travel with the currently remaining fuel, and then determine a second time period taken for the vehicle 100 to travel the remaining distance after the vehicle 100 completely runs out of fuel. Then, the controller 510 may sum the first time period and the second time period to determine a third time period.

The controller 510 may determine whether it is possible to observe the time recorded in the schedule in consideration of the third time period. The case in which it is possible to observe the time recorded in the schedule may be set to a case in which the vehicle 100 can arrive within ten minutes before or after the recorded time. That is, the controller 510 may determine whether it is possible to observe the time recorded in the schedule after the vehicle 100 stops at the gas station to be refueled.

When the controller 510 determines that it is possible to observe the time recorded in the schedule even when the vehicle 100 travels through a gas station, the controller 510 may determine whether a gas station exists on the first driving route. When the controller 510 determines that a plurality of gas stations exist on the first driving route, the controller 510 may decide a gas station located closest to the current location among the plurality of gas stations as a new stop, and when the controller 510 determines that a single gas stations exists on the first driving route the controller 510 may decide the gas station as a new stop.

When the controller 510 determines that no gas station exists on the first driving route, the controller 510 may decide a gas station located closest to the current location among gas stations at which the vehicle 100 can stop to observe the time recorded in the schedule.

When the controller 510 determines in operation 821 that it is impossible to observe the time recorded in the schedule when the vehicle 100 stops at a gas station, the controller 510 may determine whether a gas station exists on the first driving route, in operation 825. When the controller 510 determines in operation 825 that a gas station exists on the first driving route, the controller 510 may decide as a new stop a gas station existing on the first driving route around a predetermined distance before a location at which the vehicle 100 is expected to run out of fuel, in operation 826. When the controller 510 determines in operation 825 that no gas station exists on the first driving route, the controller 510 may decide as a new stop a gas station located closest to the current location among gas stations existing around a predetermined distance before the location at which the vehicle 100 is expected to run out of fuel, in operation 827.

When the controller 510 determines that it is impossible to observe the time recorded in the schedule when the vehicle 100 stops at the gas station, the controller 510 may determine whether a gas station exists on the first driving route. When the controller 510 determines that a gas station exists on the first driving route, the controller 510 may decide, as a new stop, a gas station located closest to the current location among gas stations on the first driving route around a predetermined distance, for example 10 Km, before a location at which the vehicle 100 is expected to run out of fuel.

When the controller 510 determines that no gas station exists on the first driving route, the controller 510 may decide as a new stop a gas station located closest to the current location among gas stations around a predetermined distance, for example 10 Km, before the location at which the vehicle 100 is expected to run out of fuel.

After the controller 510 decides the gas station, the controller 510 may determine whether a difference between the unit price of the gas station and an average unit price of a region where the corresponding gas station is located is greater than or equal to a predetermined reference value, in operation 828. When the controller 510 determines that the difference is not greater than the reference value, the controller 510 may decide a second driving route including the decided gas station as a new stop, as shown in FIG. 6, in operation 830. Then, the controller 510 may display the second driving route on the display 300, in operation 840. Also, when the controller 510 determines that the difference is greater than or equal to the reference value, the controller 510 may return to operation 821 to again decide a gas station.

After the controller 510 decides a gas station through the above-described process, the controller 510 may compare fuel prices of gas stations to finally decide a gas station that is to be added as a new stop.

That is, after the controller 510 decides a gas station through the above-described process, the controller 510 may decide a fuel price of the decided gas station, that is, a unit price, such as, a price per liter. The unit price of the gas station may be decided using information included in the navigation map data or provided as information updated in real time by the communication module 520 of communicating with a server.

The controller 510 may compare the unit price of the gas station to an average unit price of a region where the corresponding gas station is located. When the controller 510 determines that the unit price of the gas station is higher than the average unit price of the corresponding region by a predetermined reference value or more, the controller 510 may search another gas station.

That is, when the fuel price of the gas station is higher than the average fuel price of the region, the controller 510 may search another gas station to recommend the gas station. In the present case, the controller 510 may repeat the above-described process to again decide a gas station.

When the controller 510 determines that the unit price of the gas station is lower than the average unit price of the corresponding region, or that a difference between the unit price of the gas station and the average unit price of the corresponding region is smaller than the predetermined reference value, the controller 510 may finally decide the decided gas station as a new stop, and display the gas station on the display 300, as shown in FIG. 5.

According to the technical solution as described above, by automatically providing a driving route in connection to a schedule, and creating a new route capable of observing the schedule when refueling is needed, it is possible to increase a driver's convenience.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
a display configured to provide a user interface to enable a user to input a schedule;
a communication module configured to receive information about the schedule from an external terminal; and
a controller configured to determine a first driving route including a stop, based on a place and time included in the schedule input through the display or received through the communication module, to decide a second driving route including a gas station as a new stop based on a Distance To Empty (DTE) of the vehicle and map information of navigation system, and to display the second driving route on the display,
wherein when a as station exists on the first driving route, and it is possible to observe time of arrival at a place included in the schedule when the vehicle stops at the gas station, the controller is configured to determine the gas station existing on the first driving route as the new stop.

2. The vehicle according to claim 1, wherein the controller arranges the place included in the schedule over a time included in the schedule, and displays the arranged place and estimated time of arrival at a place on the display.

3. The vehicle according to claim 1, wherein when no gas station exists on the first driving route, the controller is configured to determine, as the new stop, a gas station at which the vehicle is configured to configured to stop to observe time of arrival at a place included in the schedule, among one or more gas stations around the first driving route.

4. The vehicle according to claim 1, wherein when it is impossible to observe time of arrival at a place included in the schedule when the vehicle stops at the gas station, the controller is configured to determine, as the new stop, a gas station on the first driving route existing around a predetermined distance before a location at which the vehicle is expected to run out of fuel.

5. The vehicle according to claim 1, wherein when it is impossible to observe time of arrival at a place included in the schedule when the vehicle stops at the gas station, and no gas station exists on the first driving route, the controller is configured to determine, as the new stop, a gas station located closest to the vehicle among one or more gas stations existing around a predetermined distance before a location at which the vehicle is expected to run out of fuel.

6. The vehicle according to claim 1, wherein the controller is configured to determine a gas station based on the DTE of the vehicle and the map information of the navigation system, and when a unit price of the decided gas station is higher than an average unit price of a region where the decided base station is located by a predetermined reference value or more, the controller is configured to determine another gas station as the new stop.

7. The vehicle according to claim 6, wherein when a gas station exists on the first driving route, and it is possible to observe time of arrival at a place included in the schedule when the vehicle stops at the gas station on the first driving route, the controller is configured to determine the gas station existing on the first driving route as the other gas station.

8. The vehicle according to claim 6, wherein when no gas station exists on the first driving route, the controller is configured to determine, as the other gas station, a gas station at which the vehicle is configured to configured to stop to observe time of arrival at a place included in the schedule, among one or more gas stations around the first driving route.

9. The vehicle according to claim 6, wherein when it is impossible to observe time of arrival at a place included in the schedule when the vehicle stops at the gas station, the controller is configured to determine, as the other gas station, a gas station on the first driving route existing around a predetermined distance before a location at which the vehicle is expected to run out of fuel.

10. The vehicle according to claim 6, wherein when it is impossible to observe time of arrival at a place included in the schedule when the vehicle stops at the gas station, and no gas station exists on the first driving route, the controller is configured to determine, as the other gas station, a gas station located closest to the vehicle among one or more gas stations existing around a predetermined distance before a location at which the vehicle is expected to run out of fuel.

11. A method of controlling a vehicle, comprising:
determining a first driving route including a stop, based on a place and time included in a schedule input through a display or received through a communication module;
deciding a second driving route including a gas station as a new stop, based on a Distance To Empty (DTE) of the vehicle and map information of navigation system; and
displaying the second driving route on the display,
wherein the deciding of the second driving route including the gas station as the new stop based on the DTE of the vehicle and the map information of the navigation system comprises, when a gas station exists on the first driving mute, and it is possible to observe time of arrival at a place included in the schedule when the vehicle stops at the gas station, deciding the gas station existing on the first driving route, as the new stop.

12. The method according to claim 11, wherein the displaying of the second driving route on the display comprises:
arranging the place included in the schedule over a time included in the schedule to display the place on the display; and
displaying estimated time of arrival at the arranged place on the display.

13. The method according to claim 11, wherein the deciding of the second driving route including the gas station as the new stop based on the DTE of the vehicle and the map information of the navigation system comprises, when no gas station exists on the first driving route, deciding, as the new stop, a gas station at which the vehicle is configured to stop to observe time of arrival at a place included in the schedule, among one or more gas stations around the first driving route.

14. The method according to claim 11, wherein the deciding of the second driving route including the gas station as the new stop based on the DTE of the vehicle and the map information of the navigation system comprises, when it is impossible to observe time of arrival at a place included in the schedule when the vehicle stops at the gas station, deciding, as the new stop, a gas station on the first driving route existing around a predetermined distance before a location at which the vehicle is expected to run out of fuel.

15. The method according to claim 11, wherein the deciding of the second driving route including the gas station as the new stop based on the DTE of the vehicle and the map information of the navigation system comprises, when it is impossible to observe time of arrival at a place included in the schedule when the vehicle stops at the gas station, and no gas station exists on the first driving route, deciding, as the new stop, a gas station located closest to the vehicle among one or more gas stations existing around a predetermined distance before a location at which the vehicle is expected to run out of fuel.

16. The method according to claim 11, wherein the deciding of the second driving route including the gas station as the new stop based on the DTE of the vehicle and the map information of the navigation system comprises:
deciding a gas station based on the DTE of the vehicle and the map information of the navigation system; and
deciding another gas station as the new stop, when a unit price of the decided gas station is higher than an average unit price of a region where the decided gas station is located by a predetermined reference value or more.

* * * * *